(12) United States Patent
Meier

(10) Patent No.: US 9,170,766 B2
(45) Date of Patent: Oct. 27, 2015

(54) METHOD OF DISPLAYING VIRTUAL INFORMATION IN A VIEW OF A REAL ENVIRONMENT

(75) Inventor: Peter Meier, Munich (DE)

(73) Assignee: Metaio GmbH, Munich (DE)

( * ) Notice: Subject to any disclaimer, the term of this patent is extended or adjusted under 35 U.S.C. 154(b) by 207 days.

(21) Appl. No.: 13/582,314

(22) PCT Filed: Feb. 28, 2011

(86) PCT No.: PCT/EP2011/052900
§ 371 (c)(1),
(2), (4) Date: Nov. 9, 2012

(87) PCT Pub. No.: WO2011/107423
PCT Pub. Date: Sep. 9, 2011

(65) Prior Publication Data
US 2013/0057581 A1    Mar. 7, 2013

(30) Foreign Application Priority Data

Mar. 1, 2010 (EP) .................................... 10155026

(51) Int. Cl.
*G09G 5/00* (2006.01)
*G06F 3/14* (2006.01)
*G02B 27/01* (2006.01)
*G06F 3/01* (2006.01)
*G06T 19/00* (2011.01)

(52) U.S. Cl.
CPC ................ *G06F 3/14* (2013.01); *G02B 27/017* (2013.01); *G06F 3/011* (2013.01); *G06T 19/006* (2013.01); *G02B 2027/014* (2013.01); *G02B 2027/0138* (2013.01); *G02B 2027/0187* (2013.01)

(58) Field of Classification Search
CPC ................. G02B 2027/0138; G02B 2027/014; G02B 2027/0187; G02B 27/017; G06F 3/011; G06F 3/14
See application file for complete search history.

(56) References Cited

U.S. PATENT DOCUMENTS

| 5,828,769 | A | * | 10/1998 | Burns ........................... 382/118 |
| 7,023,536 | B2 | | 4/2006 | Zhang et al. |
| 7,038,846 | B2 | | 5/2006 | Mandella |
| 7,088,440 | B2 | | 8/2006 | Buermann et al. |

(Continued)

OTHER PUBLICATIONS

"Determining the Instantaneous Axis of Translation from Optic Flow Generated by Arbitrary Sensor Motion"\J.H. Rieger, D.T. Lawton Siggraph Comput. Graph. 18, 1 (Jan. 1984), 24-24.

(Continued)

*Primary Examiner* — Kee M Tung
*Assistant Examiner* — Frank Chen
(74) *Attorney, Agent, or Firm* — O'Shea Getz P.C.

(57) ABSTRACT

A method of displaying virtual information in a view of a real environment comprising the following steps: providing a system for displaying of virtual information in a view of a real environment, determining a current pose of at least one part of the system relative to at least one part of the real environment and providing accuracy information of the current pose, providing multiple pieces of virtual information, and assigning a respective one of the pieces of virtual information to one of different parameters indicative of different pose accuracy information, and displaying at least one of the pieces of virtual information in the view of the real environment according to the accuracy information of the current pose in relation to the assigned parameter of the at least one of the pieces of virtual information.

12 Claims, 3 Drawing Sheets

(56) References Cited

U.S. PATENT DOCUMENTS

| | | |
|---|---|---|
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,474,809 B2 | 1/2009 | Carl et al. |
| 7,729,515 B2 | 6/2010 | Mandella et al. |
| 7,826,641 B2 | 11/2010 | Mandella et al. |
| 7,961,909 B2 | 6/2011 | Mandella et al. |
| 8,239,132 B2 * | 8/2012 | Ma et al. ............... 701/438 |
| 8,547,401 B2 * | 10/2013 | Mallinson et al. ............ 345/633 |
| 2005/0168437 A1 | 8/2005 | Carl et al. |
| 2006/0038833 A1 | 2/2006 | Mallinson et al. |
| 2008/0045138 A1 * | 2/2008 | Milic-Frayling et al. .... 455/3.04 |
| 2009/0216446 A1 | 8/2009 | Ma et al. |
| 2011/0227915 A1 | 9/2011 | Mandella et al. |
| 2012/0038549 A1 | 2/2012 | Mandella et al. |
| 2013/0194418 A1 | 8/2013 | Gonzalez-Banos et al. |

OTHER PUBLICATIONS

Buskirk, "3-D Maps, Camera Phones Put Reality in Augmented Reality", Dec. 12, 2009, http://www.wired.com/epicenter/2009/12/3d-maps-camera-phones-put-reality-in-augmented-reality/.

Rottman, "Layar Gets Some Serious Competition: Junaio Brings 3d Augmented Reality to Your iPhone", Aug. 29, 2009, http://thenextweb.com/apps/2009/10/29/layar-competition-junaio-brings-3d-augmented-reality-iphone/.

Pressigout et al. "Hybrid Tracking Approach Using Optical Flow and Pose Estimation", IEEE International Conference on Image Processing, ICIP '08, 2008.

Rieger et al. "Determining the Instantaneous Axis of Translation from Optic Flow Generated by Arbitrary Sensor Motion", SIGGRAPH Comput. Graph. 18, 1, Jan. 1984, 24-24.

Office action for CN201180011462.8 dated Aug. 1, 2014.

* cited by examiner

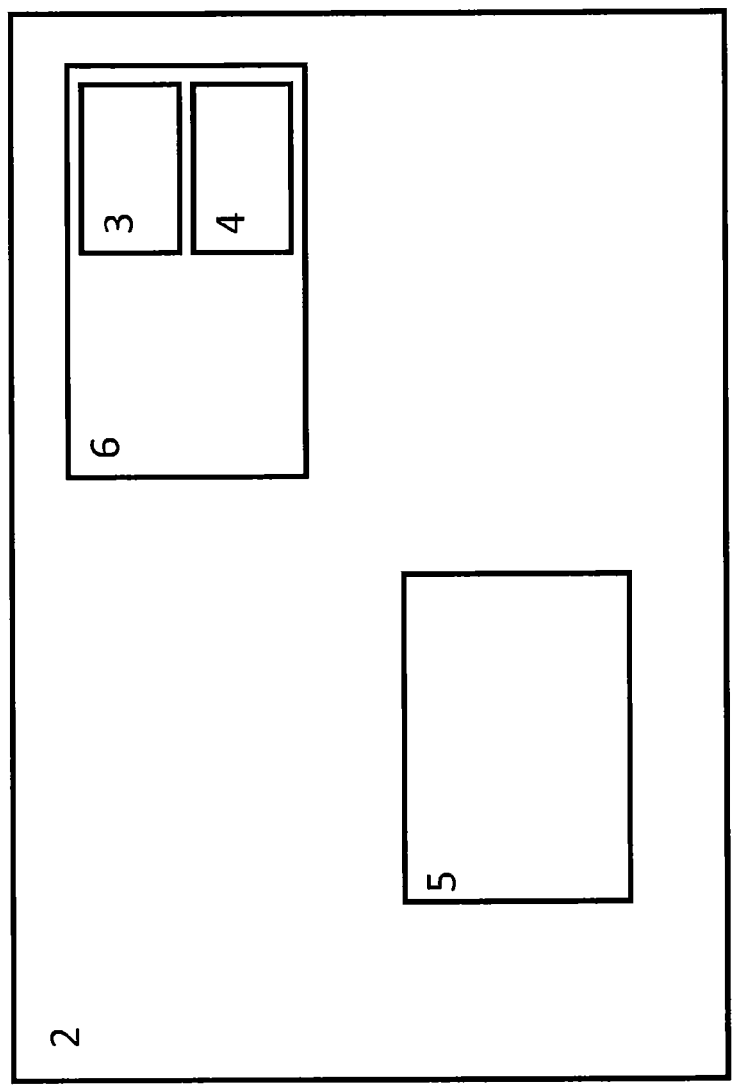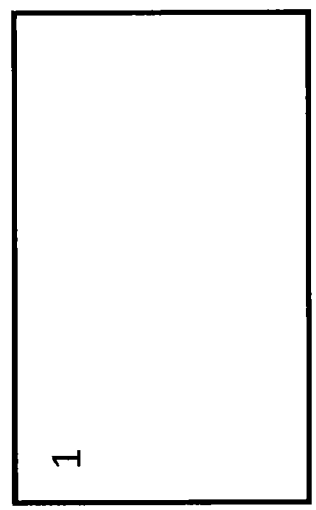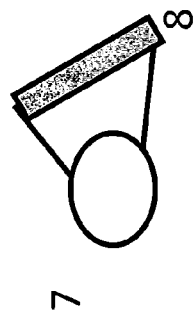
Fig. 1

Displaying according to uncertainty

METHOD OF DISPLAYING VIRTUAL INFORMATION IN A VIEW OF A REAL ENVIRONMENT

This application is entitled to the benefit of, and incorporates by reference essential subject matter disclosed in PCT Application No. PCT/EP2011/052900 filed on Feb. 28, 2011, which claims priority to European Application No. 10155026.7 filed Mar. 1, 2010.

BACKGROUND OF THE INVENTION

1. Technical Field

The invention is directed to a method of displaying virtual information in a view of a real environment in which a system for displaying of virtual information in a view of a real environment is provided and a current pose of at least one part of the system relative to at least one part of the real environment is determined.

2. Background Information

In the prior art, applications are known which augment an image or images generated by at least one camera with virtual information or objects using the so called Augmented Reality (AR) technology. In such application, a camera coupled to a processing unit such as a microprocessor takes a picture of a real environment, wherein the real environment is displayed in a view to the user on a display screen and virtual objects may be displayed in addition to the real environment, so that the real environment displayed on the display screen is augmented with virtual objects of any kind. As a display, a display screen (e.g. of a mobile device, such as a smart phone) or an optical see-through display device (e.g. a semi-transparent head mounted display) may be used. In such application, in order to augment the image with virtual objects, there is the need for the microprocessor to determine the current position and orientation (termed in the art as "pose") of the camera with respect to at least one object of the real environment in order for the microprocessor to correctly augment the captured image with any virtual objects. In this context, correctly augmenting the captured image with any virtual objects means that the virtual objects are displayed in a manner that the virtual objects fit into the scene of the image.

In the past, various publications about Augmented Reality and Virtual Reality technologies are available.

The present application is concerned with solving a detailed aspect of creating an improved method of displaying virtual, location based information. Particularly, in Augmented Reality many concepts of displaying virtual information in a view of a real environment have been made public. In Virtual Reality the concept of "level of detail" is known. Here, different representations of virtual objects can be displayed according to graphic-power of the displaying system or distance to the object.

The present invention solves a problem which has become eminent only recently, with mobile devices and location based services becoming possible and widespread. Location based services, especially the ones overlaying virtual data on top of the view of the real world (e.g. a camera image or through a semi-transparent display or by projective means, projection information on the surrounding environment), often rely on different means of localization (optional) and means of getting the orientation (optional). In other words, location based services using AR technologies often use different pose determination means. The means can use data from sensors, which are moving with the user/device (inside-out-mechanisms) or sensors, which are measuring the users' movement from outside (outside-in-mechanisms).

As a simplification, it is referred to in the following and throughout the whole application to a "pose", which could be the position in 1, 2 or 3 degrees of freedom or position and orientation in different degrees of freedom or just orientation. The pose can be relative to an earth-centered coordinate system or any other coordinate system (e.g. of a large building). The virtual information is directly or indirectly positioned with respect to the coordinate system.

Many methods have been described in the state of the art to determine the pose of an information system in respect of a coordinate system. Some of the methods use, for example, GPS, compass, or gravity-sensors, other methods rely on images or distance-measurement-devices, and many other methods are also known. Often these methods combine different sensors to estimate the pose, or switch between different sensor-systems, depending on their availability. Sometimes, also the whole method is switched from one type of pose determination method to another type of pose determination method.

Further, different sensors and/or different pose determination methods have different accuracies in determining the pose. For example, a pose determination method based on a GPS sensor operates at a lower level of accuracy (or higher level of inaccuracy, e.g. operates with a higher uncertainty) as compared to an optical based tracking method for determining the pose which operates at a higher level of accuracy (or lower level of inaccuracy, e.g. operates with a lower uncertainty). In combination with various kinds of real world scenarios, this may result in problems when displaying virtual information in a view of a real world.

For example, there may be scenarios in which virtual information is to be displayed at a rather high level of accuracy in order to fit into the scene, for example when the level of detail of the real world is rather high at the location where the virtual information is to be displayed (e.g., in an area of the real world which is rather close to the user). In such a case, the aspect of pose accuracy is rather important. On the other hand, there may also be scenarios in which the level of detail of the real world is rather low at the location where the virtual information is to be displayed (e.g., in an area of the real world which is rather distant to the user) and where the aspect of pose accuracy is less important.

Therefore, it would be beneficial to provide a method of displaying virtual information in a view of a real environment which takes account of the above mentioned aspects.

SUMMARY OF THE INVENTION

According to an aspect of the invention, there is provided a method of displaying virtual information in a view of a real environment comprising the steps of providing a system for displaying of virtual information in a view of a real environment, determining a current pose of at least one part of the system relative to at least one part of the real environment and providing accuracy information of the current pose, providing multiple pieces of virtual information, and assigning a respective one of the pieces of virtual information to one of different parameters indicative of different pose accuracy information, and displaying at least one of the pieces of virtual information in the view of the real environment according to or depending on the accuracy information of the current pose in relation to the assigned parameter of the at least one of the pieces of virtual information.

For example, the accuracy information contains information on an accuracy or inaccuracy of the pose determination. In an embodiment of the invention, the accuracy information contains information on an uncertainty. Uncertainty, which is a commonly known term in the art, is usually understood as a parameter which defines a variance of values, in the present case values associated with pose determination. However, the present invention may be used in connection with any kind of information which is indicative of pose accuracy. In this regard, it is clear to the skilled person that accuracy information includes information indicative of inaccuracy (with the terms "accuracy" and "inaccuracy" often used interchangeably in the art).

For instance, according to the invention at least one of the pieces of virtual information is displayed in the view of the real environment depending on whether the accuracy information of the current pose is beyond the assigned parameter of the at least one of the pieces of virtual information.

According to an embodiment, the accuracy information and/or a change in accuracy information of the current pose is determined by a tracking system's own accuracy mechanism, by a time elapsed since last successful pose estimation of a pose-estimation mechanism, or by a position or a change in position of the system.

According to another embodiment, the accuracy information is determined for each component of the pose (degree of freedom) individually or for orientation and position individually, and the method includes assigning a respective one of the pieces of virtual information to one of different parameters indicative of different pose accuracy information.

The invention, in principle, may be used with any kind of system which is capable of providing an AR-based service. For example, the method may be employed on a mobile device, such as a mobile phone, as a number of mobile phones today offer various required components for Augmented Reality, such as high resolution cameras and displays, accelerometers, orientation sensor, GPS, wireless connectivity by WLAN and/or radio links.

Further aspects, embodiments and advantageous features of the invention are evident from the following disclosure of embodiments.

BRIEF DESCRIPTION OF THE DRAWINGS

The invention will now be described in more detail in conjunction with the accompanying drawings which illustrate various embodiments of the invention.

FIG. 1 shows a schematic illustration of an exemplary AR scenario in which an embodiment of the invention may be employed;

DETAILED DESCRIPTION OF THE INVENTION

Figure 2:
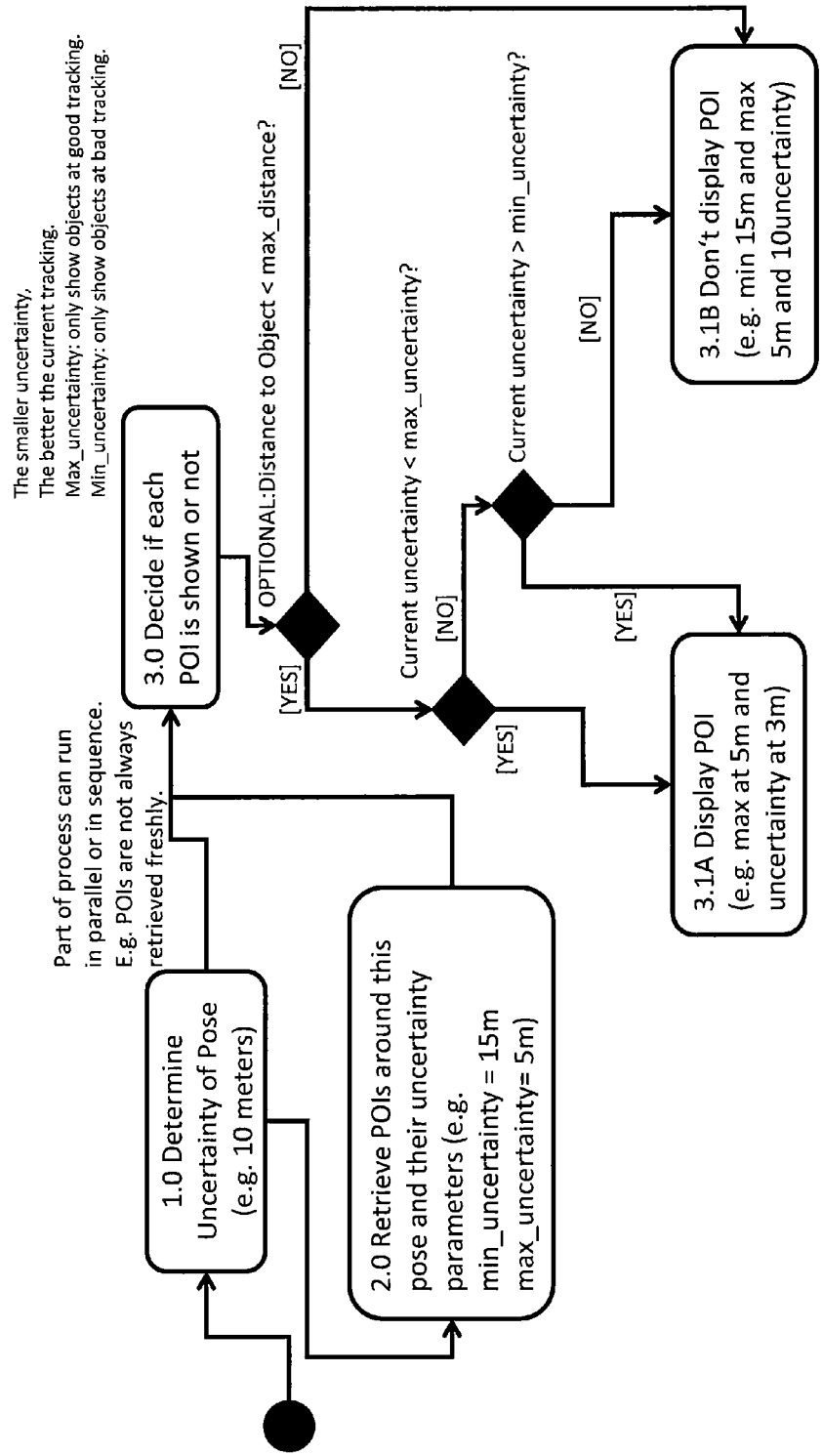
FIG. 2 shows a flowchart illustration of a method according to an embodiment of the invention.

FIG. 1 shows a schematic illustration of an exemplary AR scenario in which an embodiment of the invention may be employed. Particularly, in an example of a possible scenario in which the invention may be used, FIG. 1 shows a birdview of a tradefair. The user 7 holds a mobile device 8 to receive virtual information about the different companies and products present at the fair. The mobile device is a possible implementation of a system for displaying of virtual information in a view of a real environment. However, the invention is not limited thereto; rather any kind of AR system may be used. For example, the system for displaying of virtual information in a view of a real environment may also be a distributed system in which processors, display and/or camera etc. are not contained in a common housing.

Generally, a system for displaying of virtual information in a view of a real environment, which may be used for implementing the present invention, incorporates or is coupled with a camera (not shown) for generating at least one image of the real world, for example containing real objects 1, 2, 3, 4 as shown. The camera is provided for capturing images of a real environment and is coupled to a display screen (e.g. provided on the side of mobile device 8 facing the user 7) for providing a view of the real environment. However, any other image displaying means may be used which is suitable for displaying a view to a user, such as a semi-transparent head mounted display or any other type of mobile or stationary display device. Furthermore, the system includes a processing device (not shown), which may be for example a microprocessor.

In the present implementation, the processing device is connected with or incorporated in the mobile device 8. In a particular non-limiting application, the mobile device 8 may be a mobile telephone having an integrated orientation sensor, camera, touchscreen, and processing device. Further, the mobile device 8 may comprise an accelerometer, GPS, wireless connectivity by WLAN and/or radio links. For the purposes of the invention, the components may also be distributed and/or used in different applications. Further, they may be coupled with each other in wired or wireless fashion. According to another embodiment, the system or mobile device, respectively, could also be a fixed installation inside a car or any other vehicle.

One or more of the above components may be used for determining a current pose of at least one part of the system relative to at least one part of the real environment. With determining the current pose, accuracy information of the current pose is also provided. For example, when determining the pose by means of GPS an uncertainty of 40 (indicative of an uncertainty of 40 meters) is provided, whereas when determining the pose by means of optical tracking an uncertainty of 1 (indicative of an uncertainty of 1 meter) is provided. In this case, the uncertainty indicates a variance of possible pose values within a range of 40 m or 1 m, respectively.

In the state of the art, the system's accuracy is often also described by an expected error value and an uncertainty, all these different definitions not changing the direction of the concept of the present invention. We just expect the system to react to the accuracy definition according to the way it is modeled.

On the displaying means of the mobile device 8, an image of the real environment may be augmented with virtual information, such as POIs ("point of interest" commonly termed as POI) by displaying the virtual information superimposed with the real environment in the view in accordance with the pose of the camera. The pose of the camera may be, for example, the pose with respect to the real objects 1, 2, 3, or 4. To this end, the pose may be determined with respect to a coordinate system (not shown), which in turn is associated with the respective object of the real world. In the scenario of FIG. 1, there could be two main buildings 1 and 2 with different areas, e.g. 5 and 6. On each area there could be different products 3, 4 shown to the public of the trade fair. According to the present invention, the user 7 could be presented with different virtual visualizations not only according to the pose, but also to the pose-estimation-method's accuracy (or a combination). To this end, the system in the mobile device 8 holds or accesses multiple pieces of virtual information (such as multiple POIs), wherein a respective one of the pieces of virtual information is assigned to at least one of different parameters indicative of or related to different pose accuracy information (cf. step 2.0 in FIGS. 2 and 3 retrieving such parameters). For example, a POI associated with one of the buildings 1, 2 is assigned to a parameter which is indicative of a pose accuracy information (e.g., uncertainty) of 40 meters. On the other hand, a POI associated with one of the products 3, 4 is assigned to a parameter which is indicative of a pose accuracy information (e.g., uncertainty) of 1 meter.

For example, if the user 7 is outside the buildings 1, 2, he might just get displayed an indication of POIs related to the buildings, because the pose of the mobile device is determined using GPS and a compass having a rather high uncertainty (rather low accuracy). The information about the areas 5, 6 and the products 3, 4 is not shown, because the accuracy might be around 40 meters.

The user might now move inside building 2, where a more accurate pose-estimation-method could be used, e.g. adding wireless LAN-localization mechanisms. Now, the uncertainty of the pose determination might be around 10 meters. The pieces of virtual information about the buildings 1, 2 might now disappear and instead pieces of virtual information (e.g. POIs) about the different areas 5, 6 appear. The user 7 can use this information to orient and navigate to the area of his choice. When reaching area 6, an optical tracking mechanism could be started, which was trained with data of that area, or a QR-code (QR means quick response, which is a commonly known term in the logistics and in the mobile field) or a marker holding position-information could be detected. Now the accuracy changes to 1 meter or less. At this point, virtual product information, e.g. as a 3D-overlay, could appear and be displayed to the user. In this case the virtual information about areas 5, 6 could also stay visible.

In order to provide accuracy information of the current pose or to detect when the accuracy changes, different mechanisms may be used. The accuracy information can be retrieved from the pose-estimation-method itself or by the fusion of different accuracies of different individual pose-estimation-methods. For example 1. Time: the system can assume that after a certain time of not receiving a high-accuracy result from the more accurate tracking system, the overall system accuracy is adapted to the accuracy of the sensor which is delivering data. For example, after the scan of a QR-code ("Quick Response", standard code known in the art) or optical detection of an object, the system assumes the higher accuracy for a certain amount of time (e.g. 30 seconds). The duration of this time span can be configurable, depending on the pose estimation mechanism or the location (e.g. assuming the user spends a certain amount of time at a certain location after scanning a QR-code).

2. Current position or position based on prediction of movement: For many pose determination systems, the covered area in which the system operates is known. For example, if a camera, mounted at the ceiling of a room, is used to determine the user's position, the accuracy changes as soon as the user moves out of that camera's field of view. For a system which e.g. relies on the detection of objects in a camera image of a device-mounted camera, often the area of possible object detection and tracking is known. If the user moves outside of this area, the overall system's accuracy can immediately be reset. Some pose determining means not only rely on absolute measurements with respect to a known coordinate system, but track the pose in relation to a previous pose based on motion sensors or camera images (e.g. using optical flow, see an advanced use here: "Hybrid Tracking Approach Using Optical Flow And Pose Estimation", Muriel Pressigoutn, Eric Marchand, and Etienne Mervin, in IEEE Int. Conf. on Image Processing, ICrP'08 (2008).

If the user e.g. scans a QR-code which has a location encoded within the code, the accuracy degrades drastically as soon as the user moves away. This movement can be detected using a mechanism as described in "Determining the instantaneous axis of translation from optic flow generated by arbitrary sensor motion", J. H. Rieger, D. T. Lawton, in SIGGRAPH Comput. Graph. 18, 1 (January 1984), 24-24. In addition, the accuracy can the mechanism can of course be treated individually for different components of the pose. For example, the rotation sensors are used to determine the orientation of the system and QR-codes and GPS are used to determine the location of the system.

3. Tracking system's own accuracy mechanisms: As discussed before, for example, many tracking systems have their specific uncertainty determination methods and can deliver uncertainty data dynamically.

Accordingly, in the method of the present invention, at least one of the pieces of virtual information is displayed in the view of the real environment according to the accuracy information of the current pose in relation to the assigned parameter of the at least one of the pieces of virtual information. In other words, the method includes the step of assigning different pieces of virtual information to different values related to accuracy information, and displaying the pieces of information according to accuracy information of the current pose.

For example, a respective piece of virtual information is displayed, or not, or displayed in a different appearance or visualization method etc., if the accuracy information of the current pose is equal to or beyond a threshold defined by the respective assigned parameter. For example, at least one of the multiple pieces of virtual information is not displayed when the accuracy information of the current pose is equal to or beyond a certain threshold.

In this regard, FIG. 2 shows a flowchart illustration of a method according to an embodiment of the invention. Step 1.0 includes the step of determining an uncertainty of the current pose (e.g. 10 meters), whereas in step 2.0 POIs around this pose and their uncertainty parameters (e.g. "min uncertainty"=15 m, "max_uncertainty"=5 m) are retrieved. Part of this process can run in parallel or in sequence (e.g. POIs are not always retrieved freshly). The smaller uncertainty, the better is the current tracking. "Max_uncertainty" designates: only show objects at good tracking. "Min uncertainty" designates: only show objects at bad tracking. One of these values could be optional.

In step 3.0 it is decided for each one of the POIs whether it is shown or not. In a first optional substep, it is decided whether the distance to the object of the real environment associated with the POI is less than a parameter indicative of a distance to the object ("max_distance"). If yes, and if the uncertainty of the current pose is less than "max uncertainty", then the respective POI is displayed. If not, and if the uncertainty of the current pose is greater than "min uncertainty", then the respective POI is not displayed. If, however, the uncertainty of the current pose is equal to or less than "min uncertainty", then the respective POI is displayed. In this case, the uncertainty of the current pose is in a range between the two parameters "min uncertainty" and "max uncertainty". Certainly, to avoid too many switches in a short amount of time, the values can also be given an additional value, which expects not only being over and under a threshold, but also a certain change in a certain amount of time.

Accordingly, a first number of the multiple pieces of virtual information (POIs) are displayed when the accuracy information of the current pose is within a first range, and a second number of the multiple pieces of virtual information (POIs) are displayed when the accuracy information of the current pose is within a second range different from the first range. For example, some POIs are not shown when the accuracy has reached a certain threshold (e.g. show some POIs, when the accuracy is high, and show other POIs, when the accuracy is low)

An embodiment of the invention includes the following steps: clustering a number of the pieces of virtual information, creating a superordinate piece of virtual information from the clustered number of pieces of virtual information, and assigning the superordinate piece of virtual information to a parameter indicative of pose accuracy information which is different from the parameters assigned to the clustered number of pieces of virtual information. In this way, a single virtual information can be generated which is displayed when displaying of the number of pieces of virtual information makes no sense (e.g. automatically generating different levels of accuracy from information by clustering local, detailed information and creating a single piece of information, accordingly. E.g., clustering virtual information related to products 3 and 4 of FIG. 1 and creating a superordinate virtual information therefrom which is associated to area 6 automatically and displayed when the current pose uncertainty is higher than the uncertainty parameter of the virtual information related to the products 3, 4).

An embodiment of the invention includes the following steps: assigning a respective one of the pieces of virtual information to a respective second parameter indicative of a distance, determining a current distance of at least one part of the system to at least one part of the real environment, and displaying at least one of the pieces of virtual information in the view of the real environment according to or depending on whether the current distance is beyond the assigned second parameter of the at least one of the pieces of virtual information. Accordingly, information may be displayed according to a further POI-parameter (second parameter) which indicates the maximum distance where the information makes sense to be displayed. If the current distance is beyond that POI-parameter, then the respective POI will not be displayed.

According to a further embodiment of the invention, providing accuracy information of the current pose includes differentiating the accuracy information of the current pose depending on whether an optical or a non-optical pose determination method is used.

An embodiment of the invention includes the following steps: displaying at least one of the pieces of virtual information in the view of the real environment according to a combination of the accuracy information of the current pose and a distance of at least one part of the system to the position of the at least one of the pieces of virtual information in relation to the real environment (e.g. not displaying near virtual information at low accuracy, but displaying far virtual information at low accuracy, since the higher the distance the lower is the impact of location-inaccuracy).

An embodiment of the invention includes displaying at least one of the pieces of virtual information in the view of the real environment using different appearances or visualization methods depending on the accuracy information of the current pose (e.g. a floating image in case of low accuracy and a 3D-object in case of high accuracy).

Figure 3:
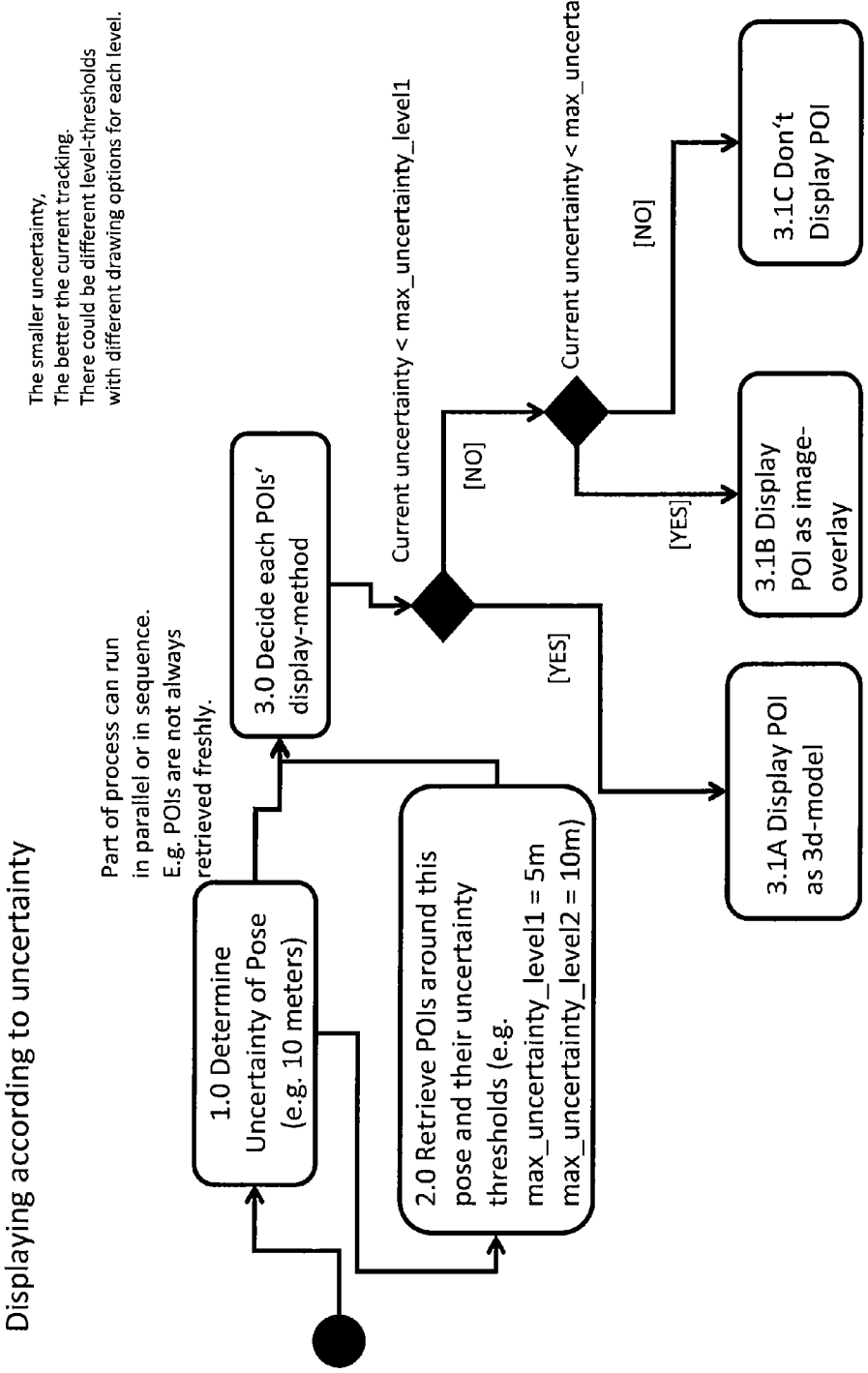
FIG. 3 shows a flowchart illustration of a method according to another embodiment of the invention.

In this regard, FIG. 3 shows a flowchart illustration of a method according to another embodiment of the invention. Basically, the process as shown in FIG. 3 may be implemented independently or in combination with the process as shown in FIG. 2. In the present embodiment of FIG. 3, steps 1.0 and 2.0 are basically the same as in FIG. 2. In step 2.0, additional parameters "max_uncertainty_level 1" and "max_uncertainty_level2" may be defined which are used in step 3.0 as shown. In step 3.0, the display method of each piece of virtual information (e.g., POI) is determined. The substeps are analogous or comparable to that of FIG. 2 with the results in steps 3.1 A to 3.1 C as indicated in FIG. 3.

Particularly, in step 3.0 it is decided how POIs are displayed. If the uncertainty of the current pose is less than "max uncertainty level1", then the respective POI is displayed as 3D-model. If not, and if the uncertainty of the current pose is less than "max_uncertainty_level2", then the respective POI is displayed as image-overlay. Otherwise, the respective POI is not displayed. Basically, it is possible to define any number of levels comparable to "max uncertainty level1" and "max_uncertainty_level2"

An embodiment of the invention includes displaying at least one of the pieces of virtual information in the view of the real environment perspectively correctly overlayed on the real environment in case of a higher accuracy of the current pose and non-correctly overlayed in case of a lower accuracy of the current pose.

An embodiment of the invention includes providing an information system which is capable of providing, in a first mode, an augmented reality view and, in a second mode, a map-view, wherein the step of displaying at least one of the pieces of virtual information according to the accuracy information of the current pose is performed in the augmented reality view, but not in the map view. As such, the accuracy information per piece of virtual information is considered in the augmented reality view, but not in the map view.

A further embodiment of the invention includes determining the visibility of drawing style of a piece of virtual information not only according to the accuracy information of the current pose, but also according to a distance and/or information about occluding objects in the real environment and/or a current speed of a display of the system with respect to a coordinate system which is fixed with respect to the real environment.

While the invention has been described with reference to exemplary embodiments, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims.

What is claimed is:

1. A method of displaying virtual information in a view of a real environment comprising the following steps:
   providing a system for displaying of virtual information in a view of a real environment;
   determining a current pose of at least one part of the system relative to at least one part of the real environment and providing accuracy information of the current pose;
   providing multiple pieces of virtual information related to at least part of the real environment contained in the view of the real environment, and assigning one of different parameters indicative of pose accuracy information to each of the multiple pieces of virtual information; and
   displaying at least one of the pieces of virtual information in the view of the real environment according to the accuracy information of the current pose in relation to the assigned parameter of the at least one of the pieces of virtual information;
   wherein at least one of the multiple pieces of virtual information is not displayed when the accuracy information of the current pose is equal to or beyond a certain threshold; and
   wherein a first number of the multiple pieces of virtual information are displayed when the accuracy information of the current pose is within a first range, and a second number of the multiple pieces of virtual information are displayed when the accuracy information of the current pose is within a second range different from the first range.

2. The method of claim 1, wherein the accuracy information contains information on an uncertainty.

3. The method of claim 1, further comprising the step of:
displaying at least one of the pieces of virtual information in the view of the real environment according to a combination of the accuracy information of the current pose and a distance of at least one part of the system to the position of the at least one of the pieces of virtual information in relation to the real environment.

4. The method of claim 1, further comprising the step of:
providing an information system which is capable of providing, in a first mode, an augmented reality view and, in a second mode, a map-view,
wherein the step of displaying at least one of the pieces of virtual information according to the accuracy information of the current pose is performed in the augmented reality view, but not in the map view.

5. The method of claim 1, wherein the accuracy information and/or a change in accuracy information of the current pose is determined by a tracking system's own accuracy mechanism, by a time elapsed since last successful pose estimation of a pose-estimation mechanism, or by a position or a change in position of the system.

6. The method of claim 1, wherein the accuracy information is determined for each component of the pose individually or for orientation and position individually, and assigning a respective one of the pieces of virtual information to one of different parameters indicative of different pose accuracy information.

7. A method of displaying virtual information in a view of a real environment comprising the following steps:
providing a system for displaying of virtual information in a view of a real environment;
determining a current pose of at least one part of the system relative to at least one part of the real environment and providing accuracy information of the current pose;
providing multiple pieces of virtual information, and assigning a respective one of the pieces of virtual information to one of different parameters indicative of different pose accuracy information;
displaying at least one of the pieces of virtual information in the view of the real environment according to the accuracy information of the current pose in relation to the assigned parameter of the at least one of the pieces of virtual information;
clustering a number of the pieces of virtual information;
creating a superordinate piece of virtual information from the clustered number of pieces of virtual information; and
assigning the superordinate piece of virtual information to a parameter indicative of pose accuracy information which is different from the parameters assigned to the clustered number of pieces of virtual information.

8. A method of displaying virtual information in a view of a real environment comprising the following steps:
providing a system for displaying of virtual information in a view of a real environment;
determining a current pose of at least one part of the system relative to at least one part of the real environment and providing accuracy information of the current pose;
providing multiple pieces of virtual information, and assigning a respective one of the pieces of virtual information to one of different parameters indicative of different pose accuracy information;
displaying at least one of the pieces of virtual information in the view of the real environment according to the accuracy information of the current pose in relation to the assigned parameter of the at least one of the pieces of virtual information;
assigning a respective one of the pieces of virtual information to a respective second parameter indicative of a distance;
determining a current distance of at least one part of the system to at least one part of the real environment; and
displaying at least one of the pieces of virtual information in the view of the real environment according to the current distance in relation to the assigned second parameter of the at least one of the pieces of virtual information.

9. A method of displaying virtual information in a view of a real environment comprising the following steps:
providing a system for displaying of virtual information in a view of a real environment;
determining a current pose of at least one part of the system relative to at least one part of the real environment and providing accuracy information of the current pose;
providing multiple pieces of virtual information, and assigning a respective one of the pieces of virtual information to one of different parameters indicative of different pose accuracy information; and
displaying at least one of the pieces of virtual information in the view of the real environment according to the accuracy information of the current pose in relation to the assigned parameter of the at least one of the pieces of virtual information,
wherein providing accuracy information of the current pose includes differentiating the accuracy information of the current pose depending on whether an optical or a non-optical pose determination method is used.

10. A method of displaying virtual information in a view of a real environment comprising the following steps:
providing a system for displaying of virtual information in a view of a real environment;
determining a current pose of at least one part of the system relative to at least one part of the real environment and providing accuracy information of the current pose;
providing multiple pieces of virtual information, and assigning a respective one of the pieces of virtual information to one of different parameters indicative of different pose accuracy information;
displaying at least one of the pieces of virtual information in the view of the real environment according to the accuracy information of the current pose in relation to the assigned parameter of the at least one of the pieces of virtual information; and
displaying at least one of the pieces of virtual information in the view of the real environment using different appearances or visualization methods depending on the accuracy information of the current pose.

11. A method of displaying virtual information in a view of a real environment comprising the following steps:
providing a system for displaying of virtual information in a view of a real environment;
determining a current pose of at least one part of the system relative to at least one part of the real environment and providing accuracy information of the current pose;
providing multiple pieces of virtual information, and assigning a respective one of the pieces of virtual information to one of different parameters indicative of different pose accuracy information;

displaying at least one of the pieces of virtual information in the view of the real environment according to the accuracy information of the current pose in relation to the assigned parameter of the at least one of the pieces of virtual information; and displaying at least one of the pieces of virtual information in the view of the real environment perspectively correctly overlayed on the real environment in case of a higher accuracy of the current pose and non-correctly overlayed in case of a lower accuracy of the current pose.

12. A method of displaying virtual information in a view of a real environment comprising the following steps:

providing a system for displaying of virtual information in a view of a real environment;

determining a current pose of at least one part of the system relative to at least one part of the real environment and providing accuracy information of the current pose;

providing multiple pieces of virtual information, and assigning a respective one of the pieces of virtual information to one of different parameters indicative of different pose accuracy information;

displaying at least one of the pieces of virtual information in the view of the real environment according to the accuracy information of the current pose in relation to the assigned parameter of the at least one of the pieces of virtual information; and determining the visibility of drawing style of a piece of virtual information not only according to the accuracy information of the current pose, but also according to a distance and/or information about occluding objects in the real environment and/or a current speed of a display of the system with respect to a coordinate system which is fixed with respect to the real environment.

* * * * *